T. F. CALLAHAN.
LIQUID MEASURING AND DISPENSING APPARATUS.
APPLICATION FILED SEPT. 2, 1919.
1,423,305.
Patented July 18, 1922.
2 SHEETS—SHEET 1.
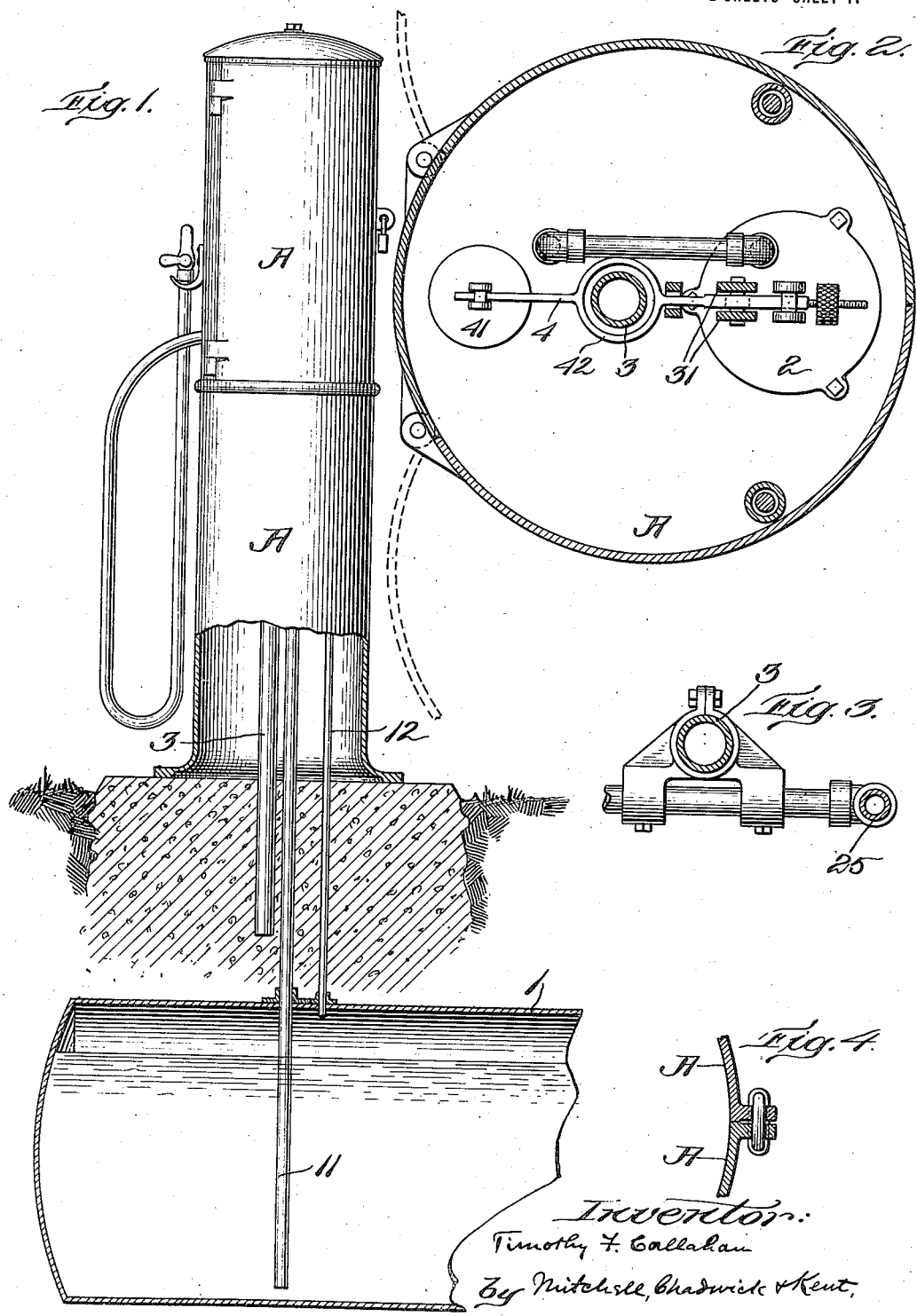

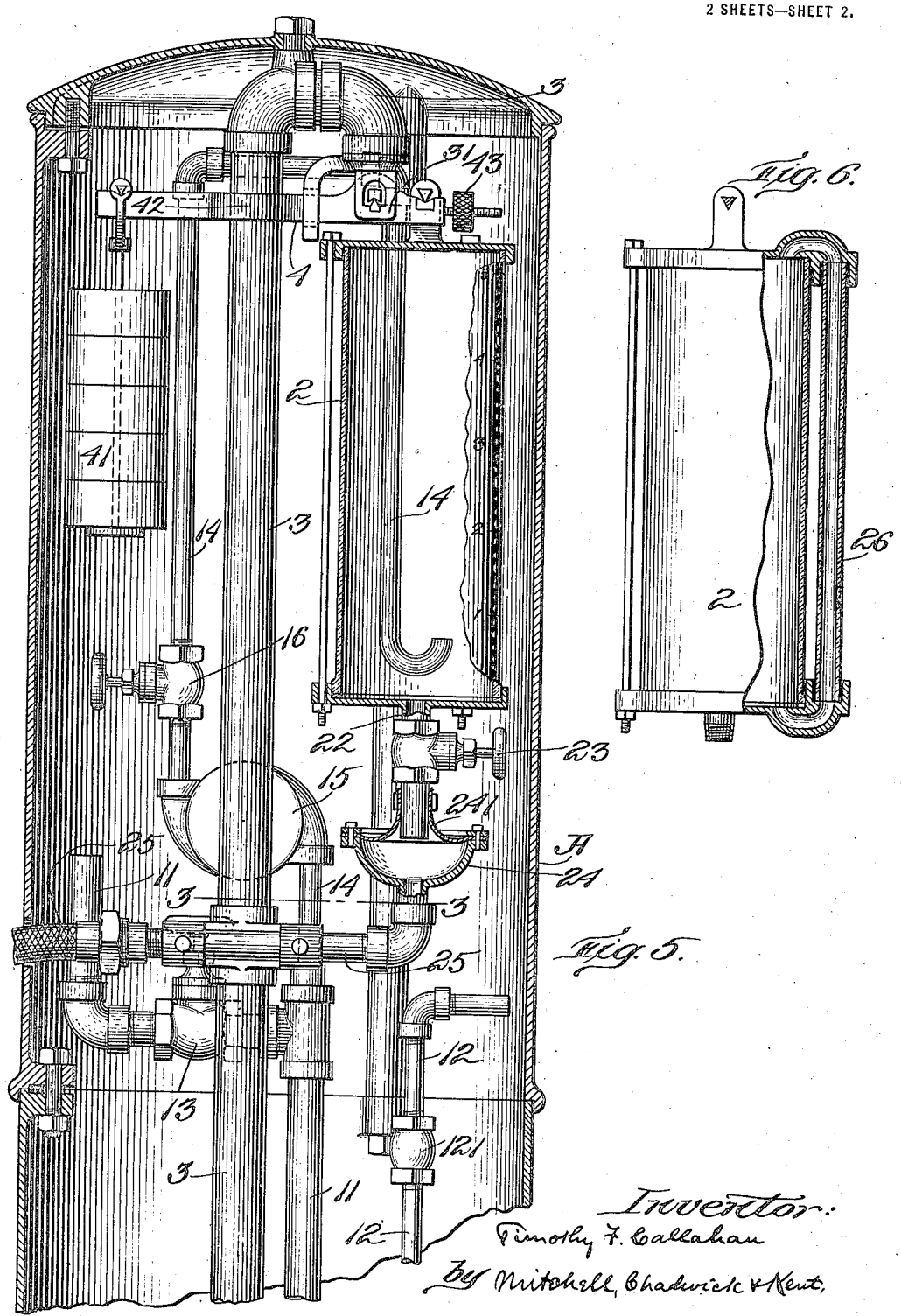

UNITED STATES PATENT OFFICE.

TIMOTHY F. CALLAHAN, OF SQUANTUM, MASSACHUSETTS.

LIQUID MEASURING AND DISPENSING APPARATUS.

1,423,305.  Specification of Letters Patent.  Patented July 18, 1922.

Application filed September 2, 1919. Serial No. 321,119.

*To all whom it may concern:*

Be it known that I, TIMOTHY F. CALLAHAN, a citizen of the United States, residing at Squantum, in the county of Norfolk and State of Massachusetts, have invented certain new and useful Improvements in Liquid Measuring and Dispensing Apparatus, of which the following is a specification.

My invention relates to means for dispensing or delivering in relatively small quantities from a storage tank, gasoline, oil or the like, the liquid delivered being measured accurately during the operation and in such fashion that the purchaser may have visible evidence of the fact.

To this end my apparatus is designed to measure the volume of the liquid delivered, in a container, either made of transparent material, as glass, or preferably made of some less fragile material, as metal, but provided with a sight opening or a tube similar to the sight feed tube employed on steam boilers. The container or the sight tube is graduated to show the amount of liquid within the container. In addition, the container is hung or otherwise connected to a weighing mechanism, which, when the predetermined amount of liquid has entered the container, will be over balanced and move.

In the drawings: Figure 1 is a general view of an installation, designed to supply gasoline at retail, showing the buried storage tank, a housing for the measuring mechanism, a standard to support the mechanism, a feed pipe and air supply pipe, by means of which compressed air may be introduced into the upper side of the storage tank to force the liquid out of the tank through the feed pipe;

Figure 2 is a plan view, on an enlarged scale, of the mechanism, the cover of the housing being removed;

Figure 3 is a sectional-plan view on line 3—3 of Figure 5;

Figure 4 is a detail sectional view of the locking means shown in Figure 1;

Figure 5 is an elevation of the operative mechanism, the housing in section and the mechanism partly in section;

Figure 6 is a detail, partly in section, of the container, showing the sight tube.

The storage tank 1 is preferably buried in the ground and is provided with a pipe 11 through which the liquid, for example gasoline, may be introduced or discharged. Another pipe 12 is also preferably employed through which air under compression is introduced, for the purpose of providing an elastic pressure above the surface of the gasoline, by means of which the gasoline may be caused to rise in the pipe 11 and delivered as desired, a valve 121 providing means to close or open pipe 12 as desired. A valve 13 opens or closes the upper end of pipe 11 as may be necessary in the operation of the device. Connected to pipe 11 is a branch 14 extending upward and having preferably a meter 15 in its course and provided with a valve 16. At its upper end pipe 14 is turned to a horizontal position and carried over the container or measuring vessel 2; again turning downward to a vertical position and entering the container 2 and extending nearly to the bottom thereof, where the pipe 14 turns upward again (see Fig. 5). The aperture in the upper end of container 2 is slightly larger than the outside diameter of pipe 14, so that there is no contact between the parts (see Fig. 2). A standard 3 carries all the moving mechanism, by means of a scale beam 4, upon the long arm of which are hung weights 41 and upon the short arm of which is suspended the container 2, the pivot point of this weighing mechanism being between two downwardly extending lugs 31. The long arm of the scale beam passes the standard 3 by means of a ring 42. At the lower end of container 2 is a discharge pipe 22, controlled by a suitable valve 23. This discharge pipe terminates over a funnel 24 connected with a delivery pipe 25 leading to the point of delivery by the usual flexible section, 251. The upper opening of the funnel 24 is closed by an annular covering 241 of silk or the like, connected at its outer periphery with the rim of the funnel and at its inner edge with the pipe 22. This protects the interior of the funnel from dust and the like and is substantially frictionless in operation. The container 2 may be provided with sight openings in its side, but I prefer to employ the usual sight tube 26 as shown in Fig. 6, the tube carrying graduation marks indicating the level of the contents of the container and preferably a colored float to make observation easy.

It will be observed that my system contemplates the measurement of the gasoline both by volume and by weight. Gasolines vary somewhat in weight, and provision is made by a movable balancing weight 43, which may be adjusted as necessary to adjust the balance for any particular grade of gasoline that is being dispensed. An adjustment may be made by filling the container carefully with gasoline and then adjusting weight 43 until a balance is obtained. Each of the weights 41, as shown, represents one gallon. If less than five gallons is required one or more of the weights is removed.

The operation is as follows: valve 121 in pipe 12 and valve 13 in pipe 11 are opened and gasoline is introduced through the open end of pipe 11, the air contained in tank 1 escaping through pipe 12. When the tank is nearly full the supply is stopped and valve 13 closed. Compressed air is now introduced through pipe 12 and, when the desired pressure has been accumulated in the tank, valve 12 is closed to retain it. When it is desired to dispense gasoline, valve 16 is opened. Gasoline will now rise in pipes 11 and 14, which will pass over into the container 2, welling upward from the up turned end of pipe 14 and not impinging directly on the bottom of the container 2. As the gasoline rises in the container, its level can be determined by the customer by the sights provided and as the predetermined amount is approached the scale beam will work and the container drop. The pipe 14 will not interfere with the dropping of the container 2, since there is no contact between that pipe and the container and consequently no friction. The silk annulus 241 will not affect the movement of the container 2. The delivery pipe 25 being connected to the receptacle to which the liquid is to be delivered, the valve 23 is opened and the contents of container 2 will pass out through pipes 25, 251. I have shown a meter 15 through which all gasoline passing out of the tank must pass. This is largely for the benefit of the seller, enabling a check to be kept upon the amount dispensed.

In the claims I have referred to a standard, but it is to be understood that by that term I mean not merely the specific standard 3, as described, but any supporting means for the moving parts, for example, the housing A might be utilized if desired, though I prefer to have a separate element to carry the parts.

I claim:

1. In liquid measuring and dispensing apparatus; a storage tank; a compressed air pipe leading to the top of the tank; a standard; a weighing mechanism supported by that standard; a graduated container carried by the weighing mechanism; a discharge pipe from the tank leading through an aperture in the top of the container to near the bottom thereof and discharging upward; all combined to cause the liquid to rise to the container by air pressure and the liquid to be simultaneously measured by volume and weight.

2. In a liquid measuring and dispensing apparatus; a storage tank; a compressed air pipe leading to the top of the tank; a standard; a weighing device supported by that standard; a measuring container carried by the weighing device; a discharge pipe from the tank leading into the lower end of the measuring container and upturned at its discharge end; all combined to cause the liquid to rise to the container by air pressure and to discharge upward and the liquid to be simultaneously measured by volume and weight.

Signed at Boston, Mass., this 28th day of August, 1919.

TIMOTHY F. CALLAHAN.